United States Patent
DiBenedetto

(10) Patent No.: US 9,995,217 B2
(45) Date of Patent: Jun. 12, 2018

(54) ROTARY VALVE FOR BLEED FLOW PATH

(71) Applicant: UNITED TECHNOLOGIES CORPORATION, Hartford, CT (US)

(72) Inventor: Enzo DiBenedetto, Kensington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 14/765,738

(22) PCT Filed: Feb. 3, 2014

(86) PCT No.: PCT/US2014/014383
§ 371 (c)(1),
(2) Date: Aug. 4, 2015

(87) PCT Pub. No.: WO2014/185997
PCT Pub. Date: Nov. 20, 2014

(65) Prior Publication Data
US 2015/0377127 A1    Dec. 31, 2015

Related U.S. Application Data

(60) Provisional application No. 61/760,211, filed on Feb. 4, 2013.

(51) Int. Cl.
*F02C 6/08* (2006.01)
*F16K 3/02* (2006.01)

(52) U.S. Cl.
CPC ............... *F02C 6/08* (2013.01); *F16K 3/029* (2013.01)

(58) Field of Classification Search
CPC ............... F02C 6/08; F16K 3/02; F16K 3/029
See application file for complete search history.

(56) References Cited

U.S. PATENT DOCUMENTS

| | | | | |
|---|---|---|---|---|
| 4,709,546 A | * | 12/1987 | Weiler | F02C 7/18 415/116 |
| 6,048,171 A | * | 4/2000 | Donnelly | F01D 17/105 137/601.05 |
| 6,805,165 B2 | * | 10/2004 | Lin | F24F 13/04 137/605 |
| 7,708,230 B2 | | 5/2010 | Cloft et al. | |
| 2004/0129317 A1 | * | 7/2004 | Bevan | F01D 17/105 137/554 |

(Continued)

FOREIGN PATENT DOCUMENTS

| | | |
|---|---|---|
| EP | 1103462 B1 | 10/2004 |
| WO | 2011137004 A2 | 11/2011 |
| WO | WO 2011137004 A2 * | 11/2011 ........... F01D 17/105 |

OTHER PUBLICATIONS

International Preliminary Report on Patentability for International Application No. PCT/US2014/014383 dated Aug. 13, 2015.

*Primary Examiner* — Patrick Maines
(74) *Attorney, Agent, or Firm* — Carlson, Gaskey & Olds, P.C.

(57) ABSTRACT

Disclosed is a gas turbine engine including a compressor section in communication with a bleed flow path. A rotary valve is provided in communication with the bleed flow path to selectively regulate a flow of fluid within the bleed flow path.

13 Claims, 3 Drawing Sheets

(56) References Cited

U.S. PATENT DOCUMENTS

| | | | |
|---|---|---|---|
| 2010/0281875 A1* | 11/2010 | Price | F01D 17/162 60/772 |
| 2012/0192569 A1* | 8/2012 | Kamp | G05D 16/2093 60/785 |
| 2015/0292358 A1* | 10/2015 | Ronan | F01D 25/24 415/110 |

* cited by examiner

ROTARY VALVE FOR BLEED FLOW PATH

GOVERNMENT CONTRACT

This invention was made with government support under Contract No. 5148262-0302-0343 awarded by the United States Army. The Government has certain rights in this invention.

BACKGROUND

Aircraft are known to make use of bleed fluid, which is a compressed fluid taken from within a gas turbine engine, for various purposes. One type of bleed fluid is bleed air, which is sourced at a point after a compressor stage and before a combustion stage.

Bleed fluid can be used to provide cabin pressure, to thermally alter the engine case, and to provide rotor blade tip modulation, among other things. Bleed fluid can further be used for deicing. In some known systems, bleed fluid is routed to various parts of an aircraft with a series of discrete pipes, each of which are provided with an individual valve for regulating the flow of bleed fluid within the pipes.

SUMMARY

A gas turbine engine according to a non-limiting embodiment of this disclosure includes a compressor section in communication with a bleed flow path. The engine further includes a rotary valve provided in communication with the bleed flow path to selectively regulate a flow of fluid within the bleed flow path.

In a further non-limiting embodiment of this disclosure, the rotary valve includes a first disk and a second disk, each of the first disk and the second disk including at least one window, the first disk and the second disk being selectively rotatable relative to one another.

In a further non-limiting embodiment of this disclosure, the first disk and the second disk are configured to be selectively rotated between a fully open position, in which the windows of the first disk and the second disk are substantially aligned, and a closed position, in which the windows of the first disk and the second disk are offset from one another.

In a further non-limiting embodiment of this disclosure, the first disk and the second disk are configured to be selectively rotated to a partially open position, intermittent the fully open position and the closed position, in which the windows of the first disk and the second disk are partially aligned.

In a further non-limiting embodiment of this disclosure, when the first disk and the second disk are in the fully open position, a fluid within the bleed flow path flows through the windows of first disk and the second disk.

In a further non-limiting embodiment of this disclosure, when the first disk and the second disk are in the closed position, a fluid within the bleed flow path is substantially blocked from flowing beyond the rotary valve.

A further non-limiting embodiment of this disclosure includes an annular bleed plenum provided radially around the compressor section.

In a further non-limiting embodiment of this disclosure, the annular bleed plenum includes a first chamber in communication with the bleed flow path, and a second chamber in communication with the first chamber.

In a further non-limiting embodiment of this disclosure, the rotary valve is provided between the first chamber and the second chamber to selectively regulate a flow a flow of fluid between the first chamber and the second chamber.

In a further non-limiting embodiment of this disclosure, the rotary valve is annular, and is provided about an engine central axis.

A further non-limiting embodiment of this disclosure includes variable inlet guide vanes in communication with the main flow path, the inlet guide vanes being selectively rotatable by way of a control arm.

In a further non-limiting embodiment of this disclosure, the rotary valve is controlled by way of the control arm, and wherein the rotary valve is configured to be in a closed position when the inlet guide vanes are in a fully open position.

A method for regulating a flow fluid according to a non-limiting embodiment of this disclosure includes providing a flow of fluid within a bleed flow path, and providing a rotary valve in communication with the bleed flow path. The rotary valve includes a first disk and a second disk selectively rotatable relative to one another. The method further includes rotating the first disk and the second disk relative to one another to selectively regulate the flow of fluid within the bleed flow path.

In a further non-limiting embodiment of this disclosure, the first disk and the second disk each include at least one window.

In a further non-limiting embodiment of this disclosure, the rotating step includes selectively aligning the windows of the first disk and the second disk to regulate the flow of fluid within the bleed flow path.

A rotary valve for a gas turbine engine according to another embodiment of this disclosure includes a first disk provided annularly about an engine central axis, and a second disk provided annularly about the engine central axis. The first disk and the second disk are rotatable relative to one another to selectively regulate a flow of bleed fluid from the gas turbine engine.

In a further non-limiting embodiment of this disclosure, the first disk and the second disk each include a plurality of windows separated by solid portions.

In a further non-limiting embodiment of this disclosure, one of the first disk and the second disk is mounted for rotation about an engine central axis, and the other of the first disk and the second disk is fixedly mounted relative to the gas turbine engine.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
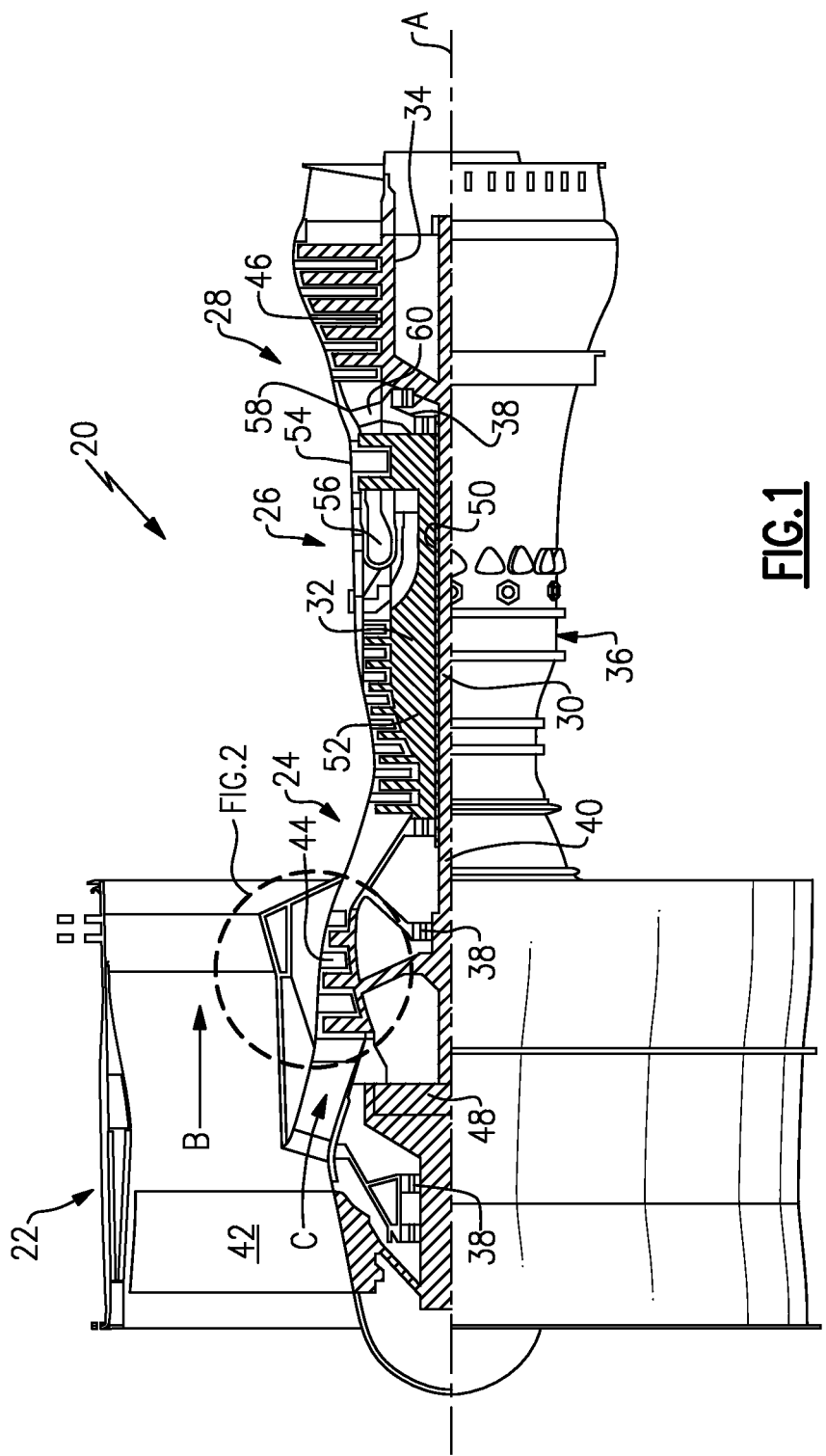
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/(518.7° R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
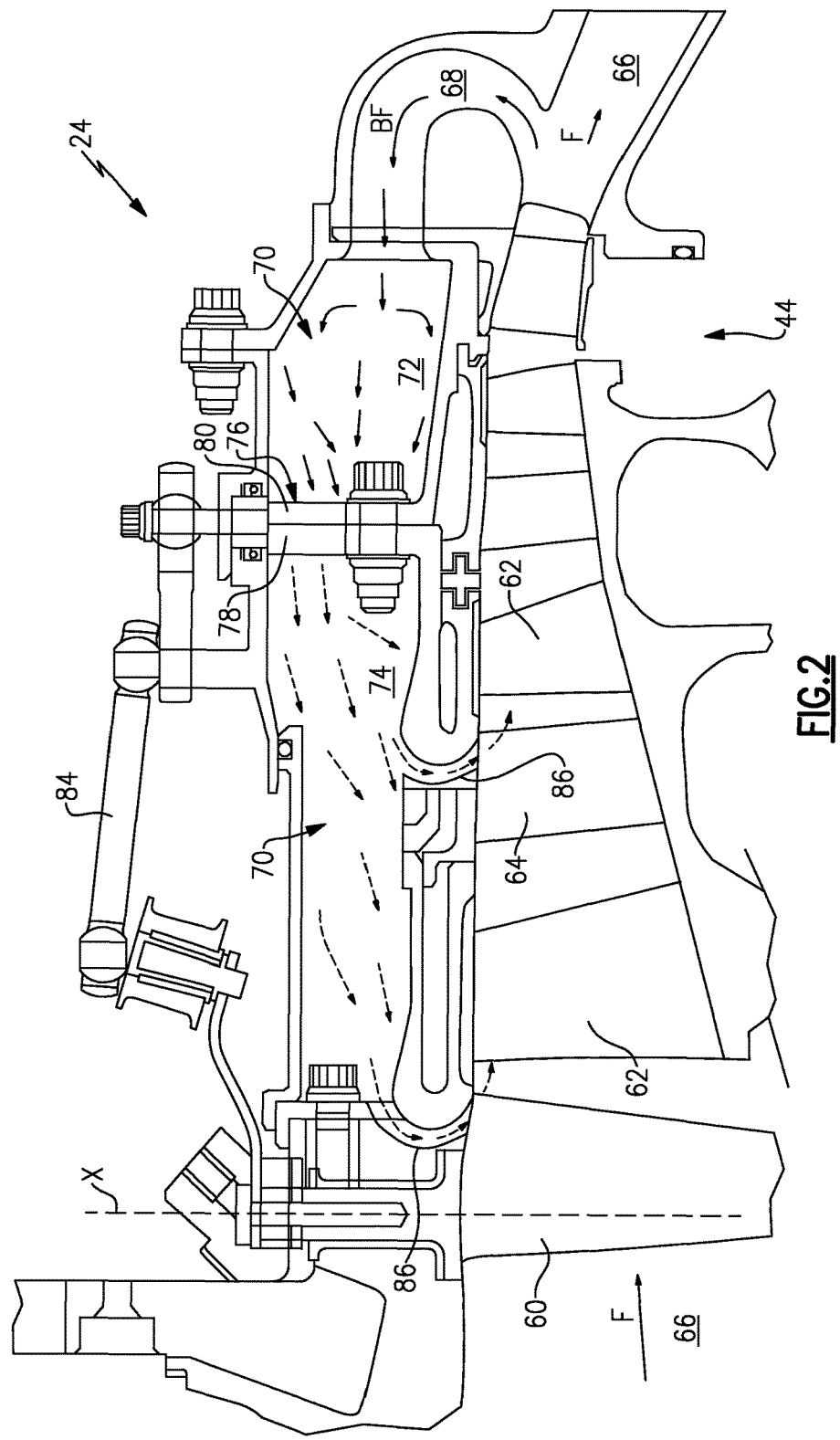
FIG. 2 is a close-up view of the encircled are in FIG. 1.

FIG. 2 is a view illustrating an example variation of the gas turbine engine 20 from FIG. 1, which also includes a low pressure compressor 44. As illustrated, the low pressure compressor 44 includes a plurality of inlet guide vanes 60, rotor blades 62 and stator vanes 64, each of which are arranged about the engine central axis A. The inlet guide vanes 60, the rotor blades 62 and the stator vanes 64 are arranged along a main, or core, flow path 66 for a main flow F.

Downstream of the low pressure compressor 44, a bleed flow path 68 branches off of the main flow path 66. Bleed fluid BF is routed away from the main flow F along the bleed flow path 68. The bleed fluid BF is primarily compressed air, however the bleed fluid BF can include water or other impurities suspended in the flow of air. In the illustrated example, a portion of the bleed flow path 68 directs the bleed fluid BF upstream, in a direction opposite of the main flow F. In other examples, the bleed fluid BF can be routed in other directions.

A plenum 70 is provided annularly around the compressor section 24. In the illustrated example, the plenum 70 includes a first chamber 72 and a second chamber 74 separated from one another by a rotary valve 76 arranged annularly about the engine central axis A. The rotary valve 76 includes, in one example, first and second disks 78, 80 which are selectively rotatable relative to one another.

Figure 3A:
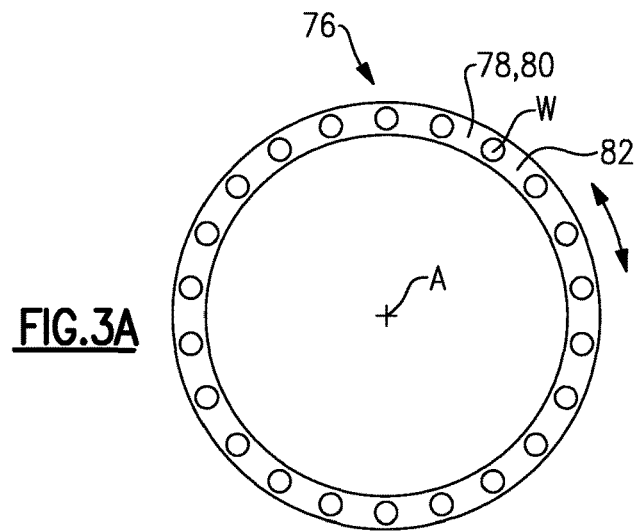
FIGS. 3A-3C illustrate a rotary valve according to this disclosure in various positions.

FIG. 3A illustrates an example of the first disk 78 and the second disk 80. The first disk 78 and the second disk 80 each include a plurality of windows W arranged circumferentially therearound. The windows W in this example are radially separated by solid portions 82.

The first disk 78 and the second disk 80 can be positioned relative to one another to regulate the flow of bleed fluid BF within the bleed flow path 68. For example, in FIG. 3A, the second disk 80 is positioned axially behind, into the page, relative to the first disk 78. In this position, the windows W of the first disk and second disk 78, 80 are substantially aligned such that a bleed flow B can relatively freely pass therethrough.

Figure 3B:
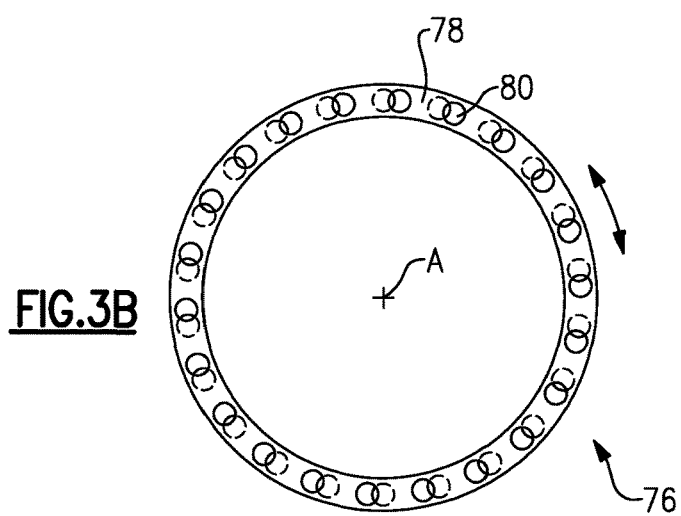

The first disk 78 and the second disk 80 can be rotated relative to one another to a partially open position, as illustrated in FIG. 3B, in which the windows W of the first disk 78 and the second disk 80 partially overlap one another.

Figure 3C:
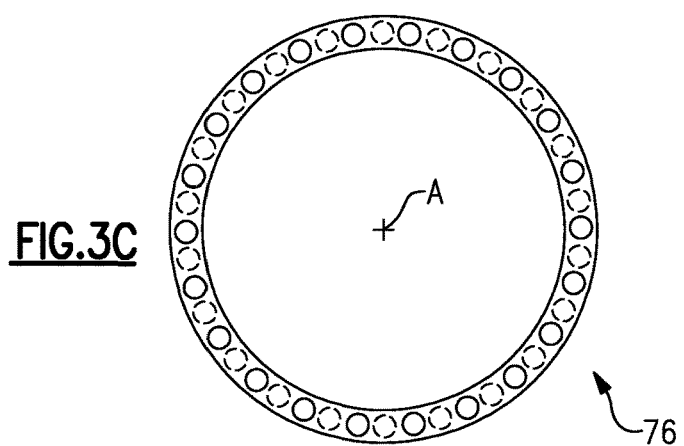

As illustrated in FIG. 3C, the disks can be further rotated to a closed position in which the windows W of the first disk and the second disk 80 are offset from one another such that the bleed fluid BF is substantially blocked from passing beyond the rotary valve 76. It should be understood that, depending on a desired valve position, the rotary valve 76 can be positioned in many positions between the fully open position of FIG. 3A and the closed position of FIG. 3C.

The positions of the first and second disks 78, 80 shown across FIGS. 3A-3C can be provided, in one example, by mounting both the first and second disks for rotation relative to the engine central axis A. In other examples, one of the first disk 78 and the second disk 80 is fixedly mounted relative to the gas turbine engine 20, while the other of the first disk 78 and the second disk 80 is mounted for rotation about the engine central axis A.

Referring back to FIG. 2, in one example of this disclosure, the gas turbine engine 20 includes variable inlet guide vanes 60 capable of being rotated about an axis X thereof to regulate the main flow F. Such rotation is affected by control arm 84. In this example, the bleed fluid BF provided to the second chamber 74 is used to affect a flow at the rotor blade tip boundary. Rotor blade tip boundary modulation is known to influence aerodynamic performance of an engine.

In the example, the second chamber 74 is in communication with a plurality of rotor blade tip boundary passageways 86 configured to provide bleed fluid BF to the tip of the rotor blades 62. No bleed fluid BF is desired when the gas turbine engine 20 is operating in a high power condition (e.g., when the inlet guide vanes 60 are arranged in a fully open position, such that the guide vanes are substantially parallel with the flow path F).

When operating in a lower power condition, the inlet guide vanes 60 are rotated relative to the fully open position by the control arm 84 to regulate the flow F. The control arm 84 is also connected to the rotary valve 76, and opens the rotary valve 76 to allow bleed fluid BF into the second chamber 74 and provide the rotor blade tip boundary fluid to the rotor blades 62.

The control arm 84 can be in communication with a controller, such as a FADEC (Full Authority Digital Engine Control) of an engine, and can be controlled using known mechanisms. In other examples, such as examples wherein the inlet guide vanes 60 are not rotatable, no control arm 84 is present, and the rotary valve 76 is controlled in another known manner, such as by being directly controlled by a FADEC. Controllers, such as FADECs, are known to include a processor capable of executing instructions stored on a computer readable medium, among other things.

This disclosure is not limited to rotor blade tip modulation, and extends to other applications that would benefit from a plenum being selectively pressurized with a bleed fluid. Such a plenum takes up less space than a plurality of discrete pipes, and requires fewer working parts.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a compressor section in communication with a bleed flow path; and
   a rotary valve provided in communication with the bleed flow path to selectively regulate a flow of fluid within the bleed flow path, wherein the rotary valve includes a first disk and a second disk, each of the first disk and the second disk including a plurality of windows separated by solid portions, the first disk and the second disk being selectively rotatable relative to one another.

2. The gas turbine engine as recited in claim 1, wherein the first disk and the second disk are configured to be selectively rotated between a fully open position, in which the windows of the first disk and the second disk are substantially aligned, and a closed position, in which the windows of the first disk and the second disk are offset from one another.

3. The gas turbine engine as recited in claim 2, wherein the first disk and the second disk are configured to be selectively rotated to a partially open position, intermittent the fully open position and the closed position, in which the windows of the first disk and the second disk are partially aligned.

4. The gas turbine engine as recited in claim 2, wherein the first disk and the second disk in the fully open position are configured to communicate a fluid along the bleed flow path and through the windows of first disk and the second disk.

5. The gas turbine engine as recited in claim 2, wherein, when the first disk and the second disk are in the closed position, a fluid within the bleed flow path is substantially blocked from flowing beyond the rotary valve.

6. The gas turbine engine as recited in claim 1, including an annular bleed plenum provided radially around the compressor section.

7. The gas turbine engine as recited in claim 6, wherein the annular bleed plenum includes a first chamber in communication with the bleed flow path, and a second chamber in communication with the first chamber.

8. The gas turbine engine as recited in claim 7, wherein the rotary valve is provided between the first chamber and the second chamber to selectively regulate a flow a flow of fluid between the first chamber and the second chamber.

9. The gas turbine engine as recited in claim 1, wherein the rotary valve is annular, and is provided about an engine central axis.

10. The gas turbine engine as recited in claim 1, including variable inlet guide vanes in communication with the main flow path, the inlet guide vanes being selectively rotatable by way of a control arm.

11. The gas turbine engine as recited in claim 10, wherein the rotary valve is controlled by way of the control arm, and wherein the rotary valve is configured to be in a closed position when the inlet guide vanes are in a fully open position.

12. A rotary valve for a gas turbine engine, comprising:
a first disk provided annularly about an engine central axis;
a second disk provided annularly about the engine central axis, the first disk and the second disk rotatable relative to one another to selectively regulate a flow of bleed fluid from the gas turbine engine, wherein the first disk and the second disk each include a plurality of windows separated by solid portions.

13. The rotary valve as recited in claim 12, wherein one of the first disk and the second disk is mounted for rotation about an engine central axis, and the other of the first disk and the second disk is fixedly mounted relative to the gas turbine engine.

* * * * *